(12) United States Patent
Weber et al.

(10) Patent No.: US 7,694,225 B1
(45) Date of Patent: Apr. 6, 2010

(54) METHOD AND APPARATUS FOR PRODUCING A PACKAGED PRESENTATION

(75) Inventors: Ralf Weber, Campbell, CA (US); Jeffrey Mitchell, Scotts Valley, CA (US); Tim Wasko, Alberta (CA)

(73) Assignee: Apple Inc., Cupertino, CA (US)

( * ) Notice: Subject to any disclaimer, the term of this patent is extended or adjusted under 35 U.S.C. 154(b) by 1365 days.

(21) Appl. No.: 10/337,907

(22) Filed: Jan. 6, 2003

(51) Int. Cl.
*G06F 3/00* (2006.01)

(52) U.S. Cl. .................. 715/723; 720/721; 720/722; 720/724; 720/725; 720/726

(58) Field of Classification Search ......... 715/723–726, 715/731
See application file for complete search history.

(56) References Cited

U.S. PATENT DOCUMENTS

| | | | | |
|---|---|---|---|---|
| 5,519,828 A | * | 5/1996 | Rayner | 715/723 |
| 5,737,552 A | * | 4/1998 | Lavallee et al. | 715/720 |
| 5,752,029 A | * | 5/1998 | Wissner | 707/104.1 |
| 5,778,108 A | * | 7/1998 | Coleman, Jr. | 382/305 |
| 5,956,026 A | * | 9/1999 | Ratakonda | 715/723 |
| 5,995,095 A | * | 11/1999 | Ratakonda | 715/500.1 |
| 6,064,438 A | * | 5/2000 | Miller | 348/465 |
| 6,111,562 A | | 8/2000 | Downs et al. | |
| 6,230,172 B1 | * | 5/2001 | Purnaveja et al. | 715/512 |
| 6,307,550 B1 | * | 10/2001 | Chen et al. | 345/418 |
| 6,453,459 B1 | * | 9/2002 | Brodersen et al. | 717/100 |
| 6,714,216 B2 | * | 3/2004 | Abe | 715/723 |
| 6,760,042 B2 | * | 7/2004 | Zetts | 715/716 |
| 6,912,327 B1 | * | 6/2005 | Hori et al. | 382/305 |
| 6,954,894 B1 | * | 10/2005 | Balnaves et al. | 715/500.1 |
| 6,988,244 B1 | * | 1/2006 | Honda et al. | 715/721 |
| 7,030,872 B2 | * | 4/2006 | Tazaki | 345/418 |
| 7,124,366 B2 | * | 10/2006 | Foreman et al. | 715/719 |
| 7,127,149 B1 | * | 10/2006 | Lin | 386/45 |
| 7,165,219 B1 | * | 1/2007 | Peters et al. | 715/716 |
| 7,200,836 B2 | * | 4/2007 | Brodersen et al. | 717/100 |
| 2002/0019833 A1 | | 2/2002 | Hanamoto | |
| 2002/0167540 A1 | * | 11/2002 | Dobbelaar | 345/716 |
| 2002/0180803 A1 | * | 12/2002 | Kaplan et al. | 345/810 |
| 2002/0194195 A1 | | 12/2002 | Fenton et al. | |
| 2002/0198909 A1 | | 12/2002 | Huynh et al. | |
| 2003/0016240 A1 | * | 1/2003 | Hanes | 345/719 |
| 2003/0090507 A1 | * | 5/2003 | Randall et al. | 345/731 |
| 2003/0189588 A1 | * | 10/2003 | Girgensohn et al. | 345/723 |
| 2003/0193520 A1 | * | 10/2003 | Oetzel | 345/723 |
| 2003/0210261 A1 | * | 11/2003 | Wu et al. | 345/719 |

(Continued)

OTHER PUBLICATIONS

U.S. Appl. No. 10/337,924, filed Jan. 6, 2003, Weber, et al., Non-published commonly owned pending U.S. Patent Application.

(Continued)

*Primary Examiner*—Ting Lee
*Assistant Examiner*—Ashraf Zahr
(74) *Attorney, Agent, or Firm*—Adeli & Tollen LLP

(57) ABSTRACT

Some embodiments of the invention provide a computerized method for creating a scene selection from a marker for a multi-image content. The method allows identification of a multi-image content. The multi-image content includes several markers. Each marker represents an image of the multi-image content. The markers are identified to generate several scenes. Each generated scene is referenced to its corresponding marker from which it is identified.

49 Claims, 8 Drawing Sheets

U.S. PATENT DOCUMENTS

| | | | |
|---|---|---|---|
| 2004/0017390 A1* | 1/2004 | Knowlton et al. | 345/731 |
| 2004/0021684 A1* | 2/2004 | Millner | 345/719 |
| 2004/0085340 A1* | 5/2004 | Dimitrova et al. | 345/723 |
| 2004/0125124 A1* | 7/2004 | Kim et al. | 345/716 |
| 2004/0125129 A1* | 7/2004 | Marsh | 345/731 |
| 2004/0125133 A1* | 7/2004 | Pea et al. | 345/751 |
| 2004/0201610 A1* | 10/2004 | Rosen et al. | 345/731 |
| 2004/0221227 A1* | 11/2004 | Wu | 715/512 |

OTHER PUBLICATIONS

U.S. Appl. No. 10/742,957, filed Dec. 20, 2003, Weber, et al., Non-published commonly owned pending U.S. Patent Application.

Final Office Action of U.S. Appl. No. 10/337,924, mailing date Dec. 27, 2007, Weber, et al., Final Office Action of a commonly owned pending U.S. Patent Application.

Final Office Action of U.S. Appl. No. 10/337,924, mailing date Nov. 1, 2006, Weber, et al., Final Office Action of a commonly owned pending U.S. Patent Application.

Non-Final Office Action of U.S. Appl. No. 10/337,924, mailing date Apr. 4, 2006, Weber, et al., Non-Final Office Action of a commonly owned pending U.S. Patent Application.

Non-Final Office Action of U.S. Appl. No. 10/742,957, mailing date May 22, 2008, Weber, et al., Non-Final Office Action of a commonly owned U.S. Patent Application.

Final Office Action of U.S. Appl. No. 10/742,957, mailing date Nov. 28, 2007, Weber, et al., Final-Office Action of a commonly owned U.S. Patent Application.

Non-Final Office Action of U.S. Appl. No. 10/742,957, mailing date Apr. 19, 2007, Weber, et al., Non-Final Office Action of a commonly owned U.S. Patent Application.

Microsoft, Paint, 1981-2001, Software, Figs. 1-3.

Ken Stone, Authoring with iDVD 2—OS 10.1, Dec. 17, 2001, Internet: http://www.kenstone.net/fcp_homepage/basic_idvd_2.html, Retrieved: Mar. 24, 2006, pp. 1-11.

* cited by examiner

| Marker 1 | Name | Associated Image Reference |
| Marker 2 | Name | Associated Image Reference |
| Marker 3 | Name | Associated Image Reference |
| ⋮ | | |
| Marker N | Name | Associated Image Reference |

METHOD AND APPARATUS FOR PRODUCING A PACKAGED PRESENTATION

FIELD OF THE INVENTION

The invention relates to multimedia applications. The invention also relates to method and apparatus for producing a packaged presentation.

BACKGROUND OF THE INVENTION

Today, many consumers use DVD authoring tools to prepare DVD presentations and to burn these presentations on DVD's, which they can then distribute. An important feature of DVD presentations is the creation of menus and sub-menus that contain scene selections. The creation of such menus and sub-menus is often time consuming. For instance, to create scene selections, the user typically manually specifies one or more sub-menus for the scene selections, and then manually associates each scene selection link in the specified menus to a video clip. Therefore, there is a need in the art for an application that automatically produces menus and specifies scene selections for DVD's. More generally, there is a need for a method that can take marked-up multi-image content from an editing application and produce portions of a marked-up packaged presentation on a DVD.

SUMMARY OF THE INVENTION

Some embodiments of the invention provide a computerized method for creating a scene selection from a marker for a multi-image content. The method allows identification of a multi-image content. The multi-image content includes several markers. Each marker represents an image of the multi-image content. The markers are identified to generate several scenes. Each generated scene is referenced to its corresponding marker from which it is identified.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figures 1, 8:
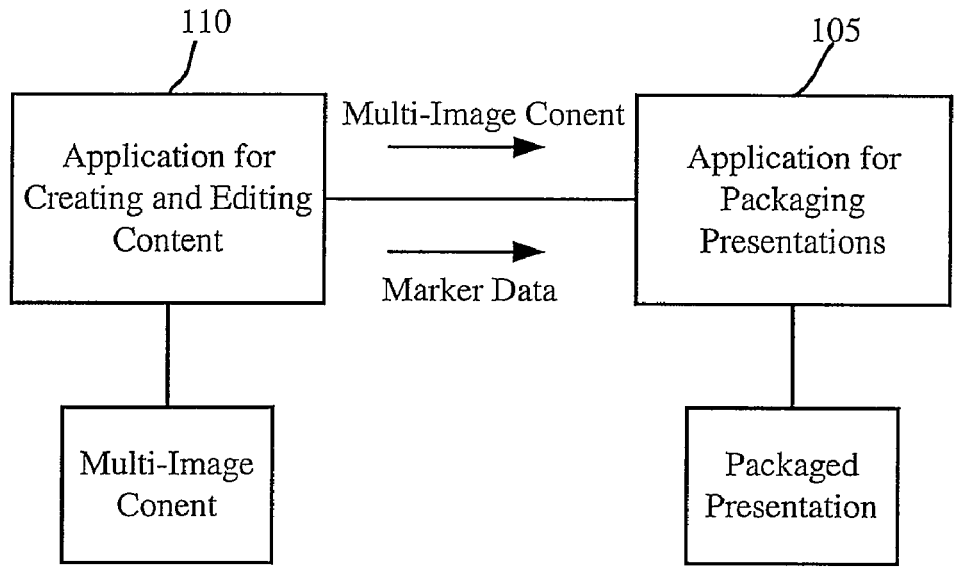
FIG. 1 illustrates an application for packaging multi-image presentations according to one embodiment.
FIG. 8 illustrates the list of markers that a DVD application receives in some embodiments from the video editing application.

FIG. 1 illustrates an application 105 that uses the invention. This application is an application for packaging multi-image presentations. In some embodiments, this application is a DVD authoring application. This application, however, might be another type of application in other embodiments of the invention.

As shown in FIG. 1, the packaging application 105 receives a multi-image content that an application 110 produces. In some embodiments, the application 110 is an application that allows a user to create and/or edit multi-image content. This content is a visual presentation, such as a slide show, a movie, an animation, etc. The application 105 also receives a set of attributes related to the multi-image content from the application 110. In some embodiments, this set includes the title of the content. In some embodiments, it also includes a set of markers, where each marker is a reference to an image in the multi-image content. Different embodiments can work with different types of markers. In fact, the invention can work with any generic reference to an image.

From the received markers and the received multi-image content, the packaging application 105 automatically generates a packaged multi-image presentation. This presentation includes at least a set of references that are derived from at least some of the received markers. Each reference in the presentation identifies an image in the packaged multi-image presentation that the application 105 generates. In some embodiments, the packaging application 105 includes a set of one or more menus, and the references to the images are items in at least one of the menus. Also, in some embodiments, the packaging application 105 allows the user to record the packaged presentation on distributable media.

Several embodiments of the invention are described below for the case where the packaging application 105 is a DVD authoring application, and the editing/creating application 110 is a video editing application. The discussion below first describes the video editing application, its output, and the markers that it uses. The discussion then focuses on the use of the output and markers in the DVD authoring application.

Figure 2:
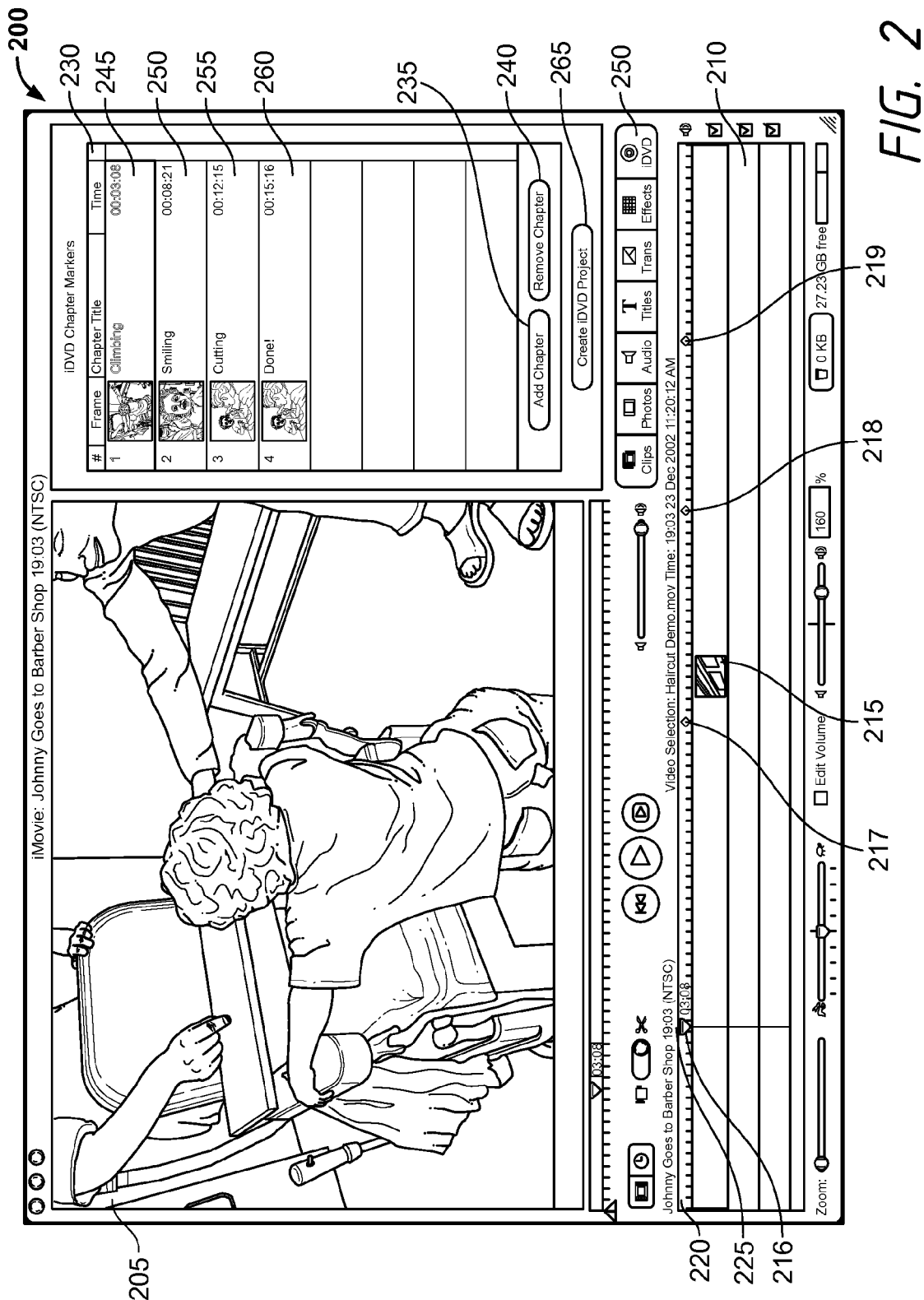
FIGS. 2-3 illustrate a graphical user interface of a video editing application used for creating and editing chapter markers.
Figure 3:

FIGS. 2 and 3 illustrate a graphical user interface (GUI) of a video editing application 200. The application's GUI allows a user to interact with the application through traditional GUI operations, such as click operations, and click-and-drag operations (e.g., to move an item in the interface) etc. This application has a display window 205 that can display video clips. Each video clip is formed by numerous frames. In other words, each frame of the video clip is a still image from the clip. The application 200 also includes a clip window 210 that displays video and audio clips that are currently being edited. In the example illustrated in FIGS. 2 and 3, only one video clip 215 is in the clip window 210. This video clip is a video of a young boy going to a barber shop.

Above the clip window is a timeline 220 and a time marker 225. When the clip is playing, the time marker 225 moves along the timeline 220 to specify the portion of the clip that is playing at each instance in time. A user can also drag the time marker 225 to a particular time on the timeline 220 to see the frame at that time and/or to play the video clip starting at that particular time.

The application 200 also includes buttons 235 and 240 to create frame markers, which in this application are referred to as chapter markers. A user can create several chapter markers for the video clip. As further illustrated below, each marker is a link to a frame of the video clip. Accordingly, the markers allow the user to jump to a desired frame in the video clip.

To add a chapter marker, the user typically clicks and drags the time marker 225 along the timeline 220. Frames of the video clip are displayed on display 205 as the time marker is dragged. When a user reaches a frame that the user desires to be chapter marked, the user stops dragging the time marker 225 and selects the add chapter button 235. A chapter marker icon appears behind the stopped time marker 225 and at the location where the user stopped the time marker 225. Each marker icon is a reference to a frame appearing at the instance in time the marker icon specifies on the timeline 220. FIGS. 2 and 3 illustrate four such icons 216-219 for four markers that the user has specified.

Once a marker is added, the application also illustrates the marker in a marker window 230. Accordingly, in the example illustrated in FIGS. 2 and 3, the marker window also lists four links 245-260 for the four markers specified. These links correspond to the four marker icons 216-219 that are set in the timeline 220. Each marker's link in the window 230 specifies four attributes. The first attribute is the marker's number. The second attribute is a thumbnail of the frame associated with the marker. The third attribute is the marker's title, which the user can write in the window 230 after the marker is added to this window. In the example illustrated in FIGS. 2 and 3, the user has specified the following four names for the markers: climbing, smiling, cutting, done. The fourth attribute is the marker's time, which is the time that the marker's icon appears on the timeline. For example, marker 1 was created at a time 3:08, chapter marker 2 was created at a time 8:21, chapter marker 3 was created at a time 12:15, and chapter marker 4 was created at a time 15:16. The user can also delete markers through the remove button 240. Specifically, the user can delete a marker by selecting it in the marker window 230, and clicking the remove button 240.

Each time a user clicks on a marker's icon in the timeline 220 or the marker's link in the window 230, the application displays in the display window 205 the frame associated with the marker. In FIG. 2, the user has clicked on the marker 245 in the window 230. This marker is associated with a frame that shows the boy climbing into the barber's chair. Hence, this clicking operation directs the application to display this frame in the display window 205. In FIG. 3, the user has clicked on the marker 250 in the window 230. This marker is associated with a frame that shows the smiling while sitting in the barber's chair. Hence, this clicking operation directs the application to display this frame in the display window 205.

Once the user is finished creating and editing the video clip, the user can launch a DVD application to package the created video clip into a DVD presentation that the user might then burn onto a DVD. To launch the DVD application, the user can click on a DVD launch button 265. When launching the DVD application, the editing application 200 supplies the DVD application with the video clip 215, a list of the marker's specified for this clip, and the clip's title.

Figure 4:
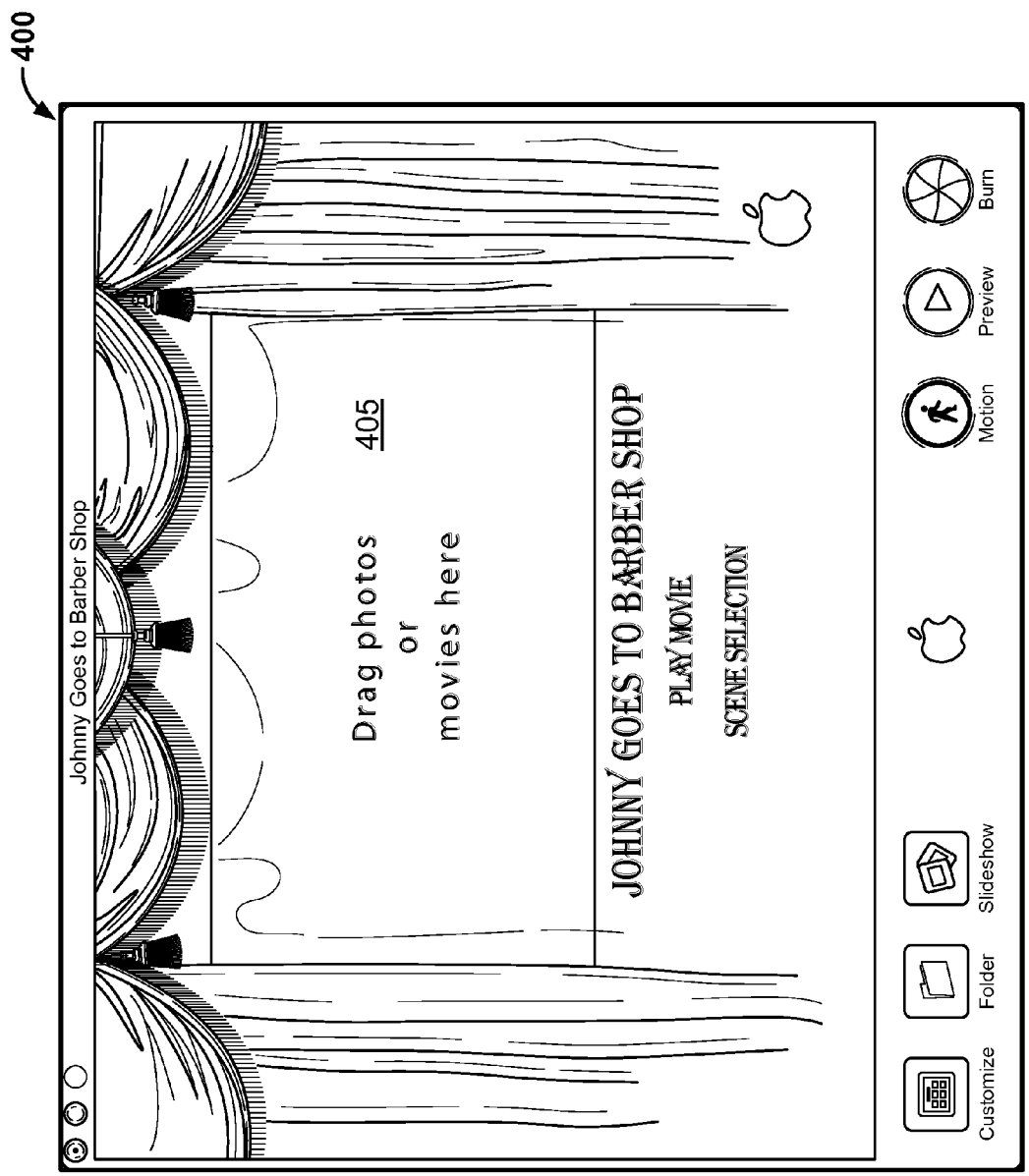
FIG. 4 illustrates a menu generated in a DVD application based on multi-image content transferred from the video editing application.
Figure 5:
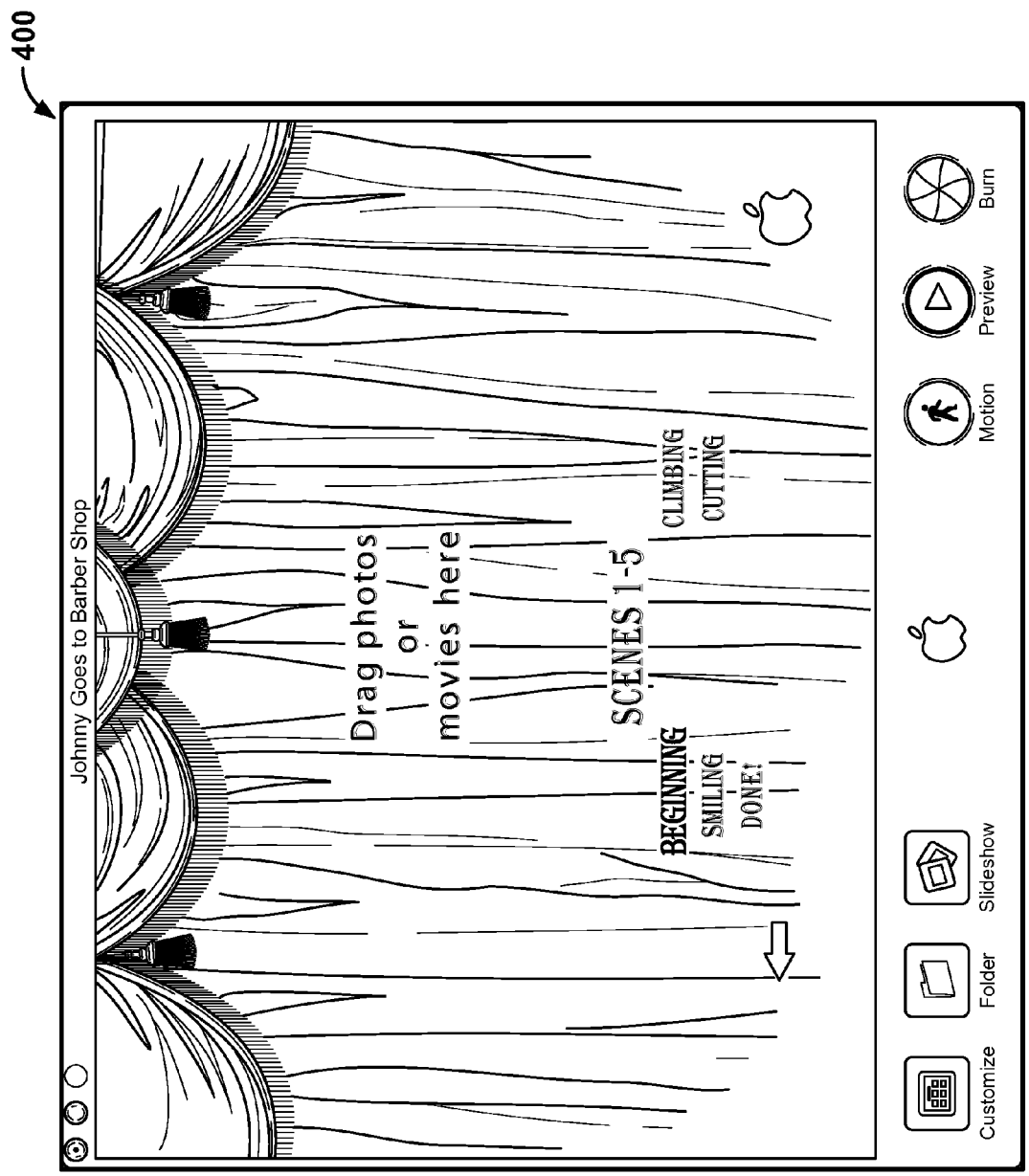
FIG. 5 illustrates a scene selection sub-menu generated in a DVD application based on multi-image content transferred from the video editing application.

Once launched, the DVD application then generates one or more menus or sub-menus. FIGS. 4 and 5 illustrate the menu and scene-selection sub-menu that the DVD application 400 specifies for the video clip 215 of the boy going to the barber shop. As shown in FIG. 4, the menu page includes the video clip's title, which as indicated in FIGS. 2 and 3 is "Johnny Goes to the Barber Shop." The menu page also includes a section 405 for displaying entertaining visual presentations. The operation of the section 405 is described in the U.S. patent application entitled "Method and Apparatus for Creating Dynamic Interactive Menus For Multimedia Formats", filed concurrently with the present application. This concurrently filed application is incorporated herein by reference.

As shown in FIG. 4, the menu page includes a play button and a scene selection button. The play button is for initiating the display of the video clip. The scene-selection button, on the other hand, is linked to a scene selection sub-menu that is illustrated in FIG. 5. In other words, when the scene-selection button is selected, the scene selection sub-menu illustrated in FIG. 5 appears.

As shown in FIG. 5, this sub-menu includes five scenes. Four of these five scenes correspond to the markers specified in the video clip. These four scenes have the same exact title as the four markers specified in the video clip. Also, when the user selects on any particular one of these four scenes, the video starts to play from the frame specified by the particular marker associated with this scene. For instance, if the user selects on the smiling scene button, the video clip starts to play from the frame illustrated in the display window 205 of FIG. 3. This is because this button is linked to this scene as it has been defined for the smiling chapter marker 250, which referred to this scene. The sub-menu in FIG. 5 also includes a scene-selection entitled "Beginning." This button refers to the start of the video clip.

Figure 6:
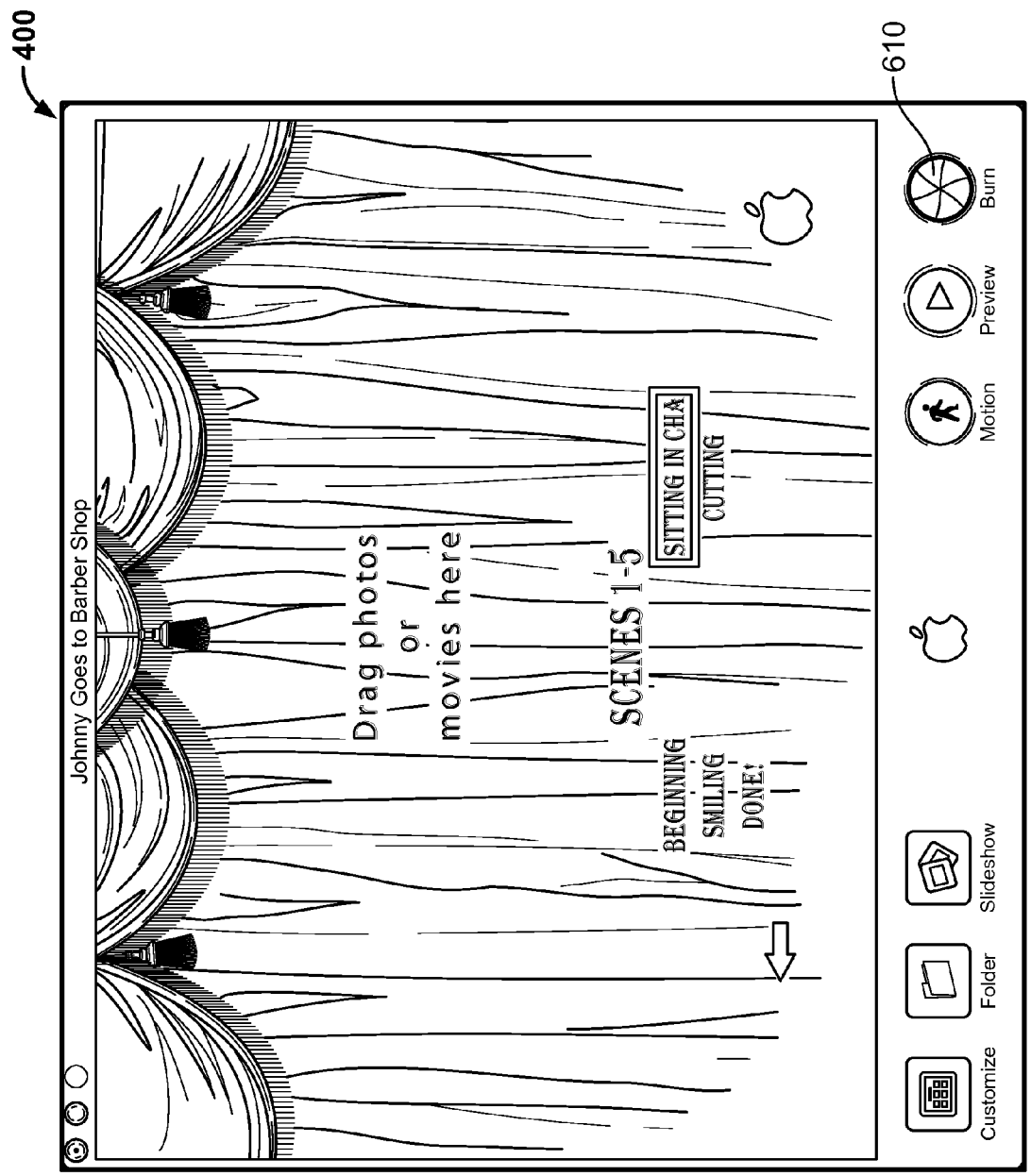
FIG. 6 illustrates modification of the scene selection name.

The sub-menu in FIG. 5 also includes back arrow, which is a button that when selected retrieves the menu page of FIG. 4. The sub-menu is also entitled "Scenes 1-5" to reflect the scenes that it lists. FIG. 6 illustrates that the user can change the title of any of the scene selections that the application automatically defines. In this figure, the title of the second scene is being changed from "Climbing" to "Sitting in Chair." Once the user makes all the desired changed to the video clip, the user can select the burn button 610 as presented by the DVD authoring application 400. The selection directs the DVD authoring application to write the video application as edited by the user on a DVD.

Figure 7:
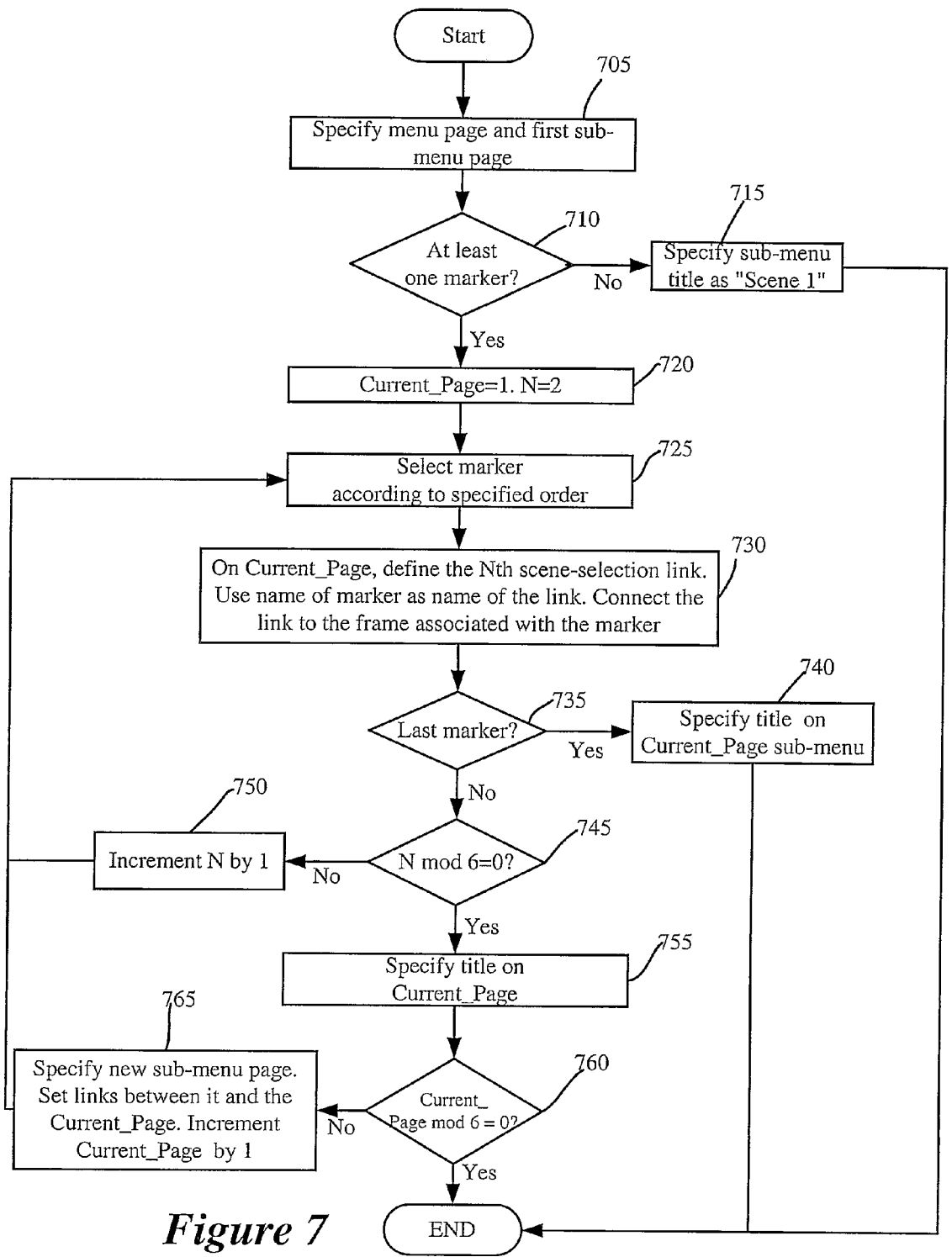
FIG. 7 is a block diagram of some embodiments for converting markers to scene selections.

FIG. 7 illustrates a process 700 that the DVD application uses in some embodiments to automatically create menus and scene-selection sub-menus from the received video clip's title and list of markers. FIG. 8 illustrates the list of markers that the DVD application receives in some embodiments from the video editing application. This list includes several markers 1 to N, a name for each marker, and an associated image reference for each marker. The process 700 of FIG. 7 at most will generate 6 scene-selection sub-menus, where each sub-menu can contain at most 6 scene selections. Other embodiments might have different restrictions or might not have such restrictions on the number of sub-menus and scene selections.

As shown in FIG. 7, the process 700 initially specifies (at 705) a menu page and the first scene selection page. On the menu page, the process specifies the received title of the received video clip. The process also specifies "Play" and "Scene Selection" buttons, which were described above. The process links the "Scene Selection" button to the first scene selection page, and links a back arrow in this page to the menu page. On the first scene selection page, the process specifies the "Beginning" scene-selection button, and associates it with the starting frame of the video clip.

After 705, the process then determines whether the marker list includes at least one marker. In the embodiment illustrated in FIG. 7, it is assumed that the video editing application does not include a marker for the beginning frame of the video clip. If the video editing application did include such a marker as a default marker or as an extraneous marker, the process 700 would either not perform 705 or would perform an intelligent determination at 710 to ignore a first marker in the received list that refers to the beginning frame of the video clip.

If the process determines (at 710) that the received list does not include at least one marker, the process specifies (at 715) the title of the first scene-selection sub-menu as "Scene 1" and then terminates. Otherwise, the process sets (at 720) a variable Current_Page to 1 and sets a variable N to 2. The variable Current_Page represents a page of the scene-selection sub-menu, while the variable N corresponds to the scene selection number.

The marker's in the received marker list are sorted based on the order that they appear in the video clip. In other words, the first marker on the list is the first marker in the clip, the second marker on the list is the second marker in the clip, and so on. After 720, the process selects (at 725) the top most marker on the list that it has not yet examined. On the sub-menu Current_Page, it then defines (at 730) the Nth scene-selection button. It names this button with the name of the marker that was last selected at 725. It also links this button with the frame identified by the frame reference of the marker that was last selected at 725.

Next, the process determines (at 735) whether it has examined all the markers on the received marker list. If so, the process (at 740) specifies the title on the sub-menu Current_Page. This title is based on the value of the variable N. For instance, the title of the sub-menu Current_Page (1) N is not equal to 7, 13, 19, 25, or 31, is "Scenes S to N", where S is (Current_Page-1)*6+1, or (2) when N equals 7, 13, 19, 25, or 31, is "Scene N". After 740, the process terminates.

When the process determines (at 735) that it has not examined all the markers on the received marker list, the process determines (at 745) whether N mod 6 equals 0. If not, the process increments (at 750) N by 1, and returns to 725, which was described above. Otherwise, the process specifies (at 755) as "Scenes S to N", where S is (Current_Page-1)*6+1. After 755, the process determines (at 760) whether Current_Page mod 6 is zero. If not, the process defines (at 765) a new sub-menu page. It defines a back arrow in the new sub-menu page, and links this back arrow to the sub-menu Current_Page. It defines a forward arrow in the sub-menu Current_Page and links it to the newly specified sub-menu page. In the newly specified sub-menu page, the process might also specify a button that links to the main menu page. At 765, the process then increments the Current_Page by 1. After 765, the process transitions to 725, which was described above. When the process determines (at 760) that the Current_Page mod 6 is zero, it terminates.

Figure 9:
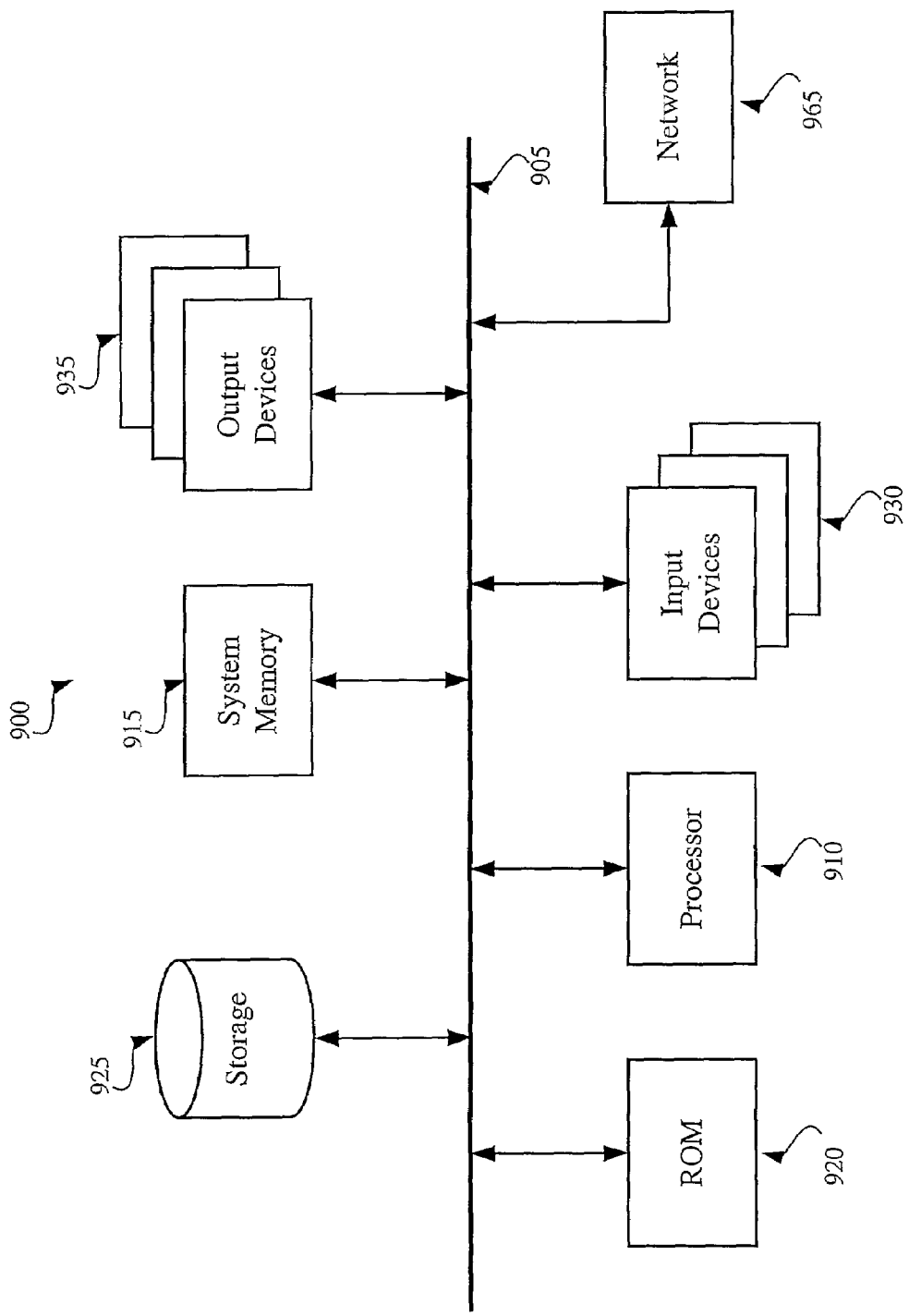
FIG. 9 illustrates a computer system with which one embodiment of the invention is implemented.

FIG. 9 presents a computer system with which one embodiment of the invention is implemented. Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925.

From these various memory units, the processor 910 retrieves instructions to execute and data to process in order to execute the processes of the invention. The read-only-memory (ROM) 920 stores static data and instructions that are needed by the processor 910 and other modules of the computer system.

The permanent storage device 925, on the other hand, is read-and-write memory device. This device is a non-volatile memory unit that stores instruction and data even when the computer system 900 is off. Some embodiments of the invention use a mass-storage device (such as a magnetic or optical disk and its corresponding disk drive) as the permanent storage device 925.

Other embodiments use a removable storage device (such as a floppy disk or Zip® disk, and its corresponding disk drive) as the permanent storage device. Like the permanent storage device 925, the system memory 915 is a read-and-write memory device. However, unlike storage device 925, the system memory is a volatile read-and-write memory, such as a random access memory. The system memory stores some of the instructions and data that the processor needs at runtime. In some embodiments, the invention's processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keyboards and cursor-controllers. The output devices 935 display images generated by the computer system. For instance, these devices display IC design layouts. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet) or a network of networks (such as the Internet). Any or all of the components of computer system 900 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computerized method for creating a menu for a presentation of a multi-image content, said method comprising:

in a content editing application:
displaying images of the multi-image content;
defining a plurality of markers for the multi-image content, said
defining comprising associating each particular marker with a particular image of the multi-image content; and
displaying a representation of a marker, wherein the representation comprises a thumbnail image of the image associated with the marker, wherein the representation is displayed in a first display area, wherein a selection of the representation displays the image associated with the marker in a second display area; and in a content packaging application:
receiving the plurality of defined markers; and
from the plurality of markers, generating the menu to comprise a plurality of selectable references that correspond to the plurality of markers, said generating comprising associating each particular selectable reference with the particular image associated with the particular selectable reference's corresponding marker, wherein a selection of a particular selectable reference causes the presentation to commence at the particular image associated with the particular selectable reference.

2. The computerized method of claim 1, wherein the multi-image content is a video clip.

3. The computerized method of claim 1 further comprising presenting the generated menu in a display area of said content packaging application.

4. The computerized method of claim 3, wherein said presenting comprises displaying a menu selection.

5. The computerized method of claim 4, wherein said generating comprises including a sub-menu in the menu, the method further comprising receiving selection of the menu selection to display the sub-menu.

6. The computerized method of claim 5, wherein the sub-menu is a scene selection menu that comprises at least one of the selectable references.

7. The computerized method of claim 1, wherein said generating further comprises identifying a title of the multi-image content, and presenting the title of the multi-image content on the menu.

8. The computerized method of claim 1, wherein said generating comprises including a plurality of pages in said menu, wherein at least one page includes a plurality of the selectable references.

9. The computerized method of claim 8, wherein each page includes up to six selectable references.

10. The computerized method of claim 1 further comprising, in said content packaging application, receiving the multi-image content from said content editing application prior to generating the menu.

11. The computerized method of claim 10, wherein said defining comprises receiving identification of each particular image prior to associating each particular marker with the particular image.

12. The computerized method of claim 1, wherein the multi-image content is video, and the content editing application is a video editing application.

13. The computerized method of claim 1 further comprising retrieving the multi-image content prior to defining the plurality of markers.

14. The computerized method of claim 1, wherein the content packaging application is a DVD application.

15. The computerized method of claim 1 further comprising, in the content packaging application, receiving selection of a selectable option for transferring the multi-image content and the menu to a distributable multimedia item, and transferring the multi-image content and the menu to said distributable multimedia item.

16. The computerized method of claim 15, wherein the distributable multimedia item is a digital video disk (DVD).

17. The computerized method of claim 1, further comprising:
receiving selection of the particular selectable reference from the plurality of selectable references; and
playing the multi-image content starting from the particular image associated with the selected reference on a display.

18. The computerized method of claim 1, wherein each of the markers comprises a particular identifier, wherein each of the plurality of the selectable references comprises a scene name that corresponds to the particular identifier.

19. The computerized method of claim 18 further comprising receiving modification to at least one of the scene names.

20. The computerized method of claim 1, wherein the multi-image content is a movie.

21. The computerized method of claim 1, wherein each marker comprises a plurality of attributes that includes a reference to the associated image and a name for identifying a particular scene.

22. A method for automatically generating a menu for a multi-image content on a computing device, said method comprising:
receiving a plurality of markers that were associated with a plurality of images in the multi-image content during a content editing session to facilitate the automatic generation of said menu, wherein the receiving comprises receiving a list of markers, said list including the plurality of markers, a name for each of the plurality of markers, and an associated image reference for each of the plurality of markers;
determining if the list of markers includes at least one marker;
incrementing a marker counter by one if the determination results in one marker being found in the list of markers;
determining if the list of markers includes any other markers;
from the plurality of markers, automatically generating the menu to comprise a plurality of selectable references that correspond to the plurality of markers, said generating comprising associating each particular selectable reference with a particular image associated with a particular marker that corresponds to the particular selectable reference; and
transferring the multi-image content and the menu to a distributable multimedia item for playing back the multi-image content on a device, wherein a user's selection of a particular selectable reference in the menu directs the device to play the multi-image content starting from the particular image associated with the particular selectable reference.

23. The method of claim 22, wherein the multi-image content is a video and each of the associated image reference points to a particular frame in said video.

24. The method of claim 22, wherein the receiving, generating, and transferring are performed by a content packaging application that executes on said computing device.

25. The method of claim 22, wherein the menu is a scene selection menu that includes the particular selectable reference.

26. The method of claim 22, wherein the menu is a multi-page menu that includes a scene selection menu comprising at least one of the selectable references and a main menu comprising a link to the scene selection menu.

27. The method of claim 22, wherein the scene selection menu comprises a plurality of pages, wherein a page includes at least two of the selectable references.

28. A computer readable medium storing a set of computer programs for creating a menu for a multi-image content, the set of computer programs comprising a set of instructions for:
in a content editing program:
displaying images of the multi-image content;
defining a plurality of markers for the multi-image content, said defining comprising associating each particular marker with a particular image of the multi-image content; and
displaying a representation of a marker, wherein the representation comprises a thumbnail image of the image associated with the marker, wherein the representation is displayed in a first display area, wherein a selection of the representation displays the image associated with the marker in a second display area;

in a content packaging program:

receiving the plurality of defined markers; and from the plurality of markers, generating the menu to comprise a plurality of selectable references that correspond to the plurality of markers, said generating comprising associating each particular selectable reference with the particular image associated with the particular selectable reference's corresponding marker, wherein a selection of a particular selectable reference causes the presentation to commence at the particular image associated with the particular selectable reference.

29. The computer readable medium of claim 28, wherein the content packaging program is a digital video disc (DVD) application for creating DVDs.

30. The computer readable medium of claim 28, wherein the multi-image content is a video clip.

31. The computer readable medium of claim 28, wherein the content packaging program further comprises a set of instructions for presenting the menu on a display, said menu comprising a menu selection which when selected presents a scene selection sub-menu that includes at least one of the selectable references.

32. A computerized method for creating a menu for a presentation of a multi-image content, said method comprising:

in a content editing application:

displaying images of the multi-image content;

defining a plurality of markers for the multi-image content, said defining comprising associating each particular marker with a particular image of the multi-image content; and displaying a representation of a marker, wherein the representation comprises a thumbnail image of the image associated with the marker, wherein a selection of the representation moves a scrollbar from a first location to a second location, said second location corresponding to the location of the associated image of the marker in the multi-image content; and in a content packaging application:

receiving the plurality of defined markers; and from the plurality of markers, generating the menu to comprise a plurality of selectable references that correspond to the plurality of markers, said generating comprising associating each particular selectable reference with the particular image associated with the particular selectable reference's corresponding marker, wherein a selection of a particular selectable reference causes the presentation to commence at the particular image associated with the particular selectable reference.

33. The method of claim 32, wherein each of the plurality of markers comprises a title for identifying a corresponding selectable reference.

34. The method of claim 32, wherein each of the plurality of markers comprises an attribute that specifies a number for identifying the sequential order in which the particular marker was associated.

35. The method of claim 32, wherein each of the plurality of markers comprises an attribute that specifies a time corresponding to the time when the particular image is displayed.

36. The method of claim 32, wherein the menu is for a distributable medium comprising the multi-image content.

37. A computer readable medium storing a computer program which when executed by at least one processor automatically creates a menu for a multi-image content, the computer program comprising a set of instructions for:

receiving a plurality of markers that were associated with a plurality of images in the multi-image content during a content editing session to facilitate the automatic generation of said menu, wherein the receiving comprises receiving a list of markers, said list including the plurality of markers, a name for each of the plurality of markers, and an associated image reference for each of the plurality of markers;

determining if the list of markers includes at least one marker;

incrementing a marker counter by one if the determination results in one marker being found in the list of markers;

determining if the list of markers includes any other markers;

from the plurality of markers, automatically generating the menu to comprise a plurality of selectable references that correspond to the plurality of markers, said generating comprising associating each particular selectable reference with a particular image associated with a particular marker that corresponds to the particular selectable reference; and transferring the multi-image content and the menu to a distributable multimedia item for playing back the multi-image content on a device, wherein a user's selection of a particular selectable reference in the menu directs the device to play the multi-image content starting from the particular image associated with the particular selectable reference.

38. The computer readable medium of claim 37, wherein each of the plurality of markers comprises a title for identifying a particular selectable reference.

39. The computer readable medium of claim 37, wherein each of the plurality of markers comprises an attribute that specifies a number for identifying the sequential order in which the particular marker was associated.

40. A method of implementing a graphical user interface ("GUI") for a multimedia editing application, said multimedia editing application stored on a computer readable medium of a computing device and for execution by at least one processor, the method comprising:

providing a first display area for displaying images of a multi-image content, said multi-image content comprising a plurality of images;

providing a first control for defining a plurality of markings, each particular marking identifying a particular image in the multi-image content;

providing a second display area for displaying representations of the defined markings, wherein a representation is a selectable item which when selected displays the particular image associated with the particular marking on the first display area; and providing a second control for initiating the generation of a menu for a presentation of the multi-image content based on the defined plurality of markings, said menu comprising a plurality of selectable scenes that correspond to the plurality of markings, each particular selectable scene associated with the particular image identified by the particular marking that corresponds to the particular selectable scene, wherein a selection of a particular selectable scene causes the presentation of the multi-image content to start at the particular image associated with the particular selectable scene.

41. The method of claim 40, wherein each of the representations comprises a thumbnail image of the particular image associated with the particular marking.

42. The method of claim 40, wherein the menu comprises a plurality pages, at least one page comprising the particular selectable scene.

43. The method of claim 40, wherein said second control initiates the generation by directing another program to create the menu based on the defined markings.

44. A method of implementing a graphical user interface ("GUI") for a multimedia editing application, said multimedia editing application stored on a computer readable medium of a computing device and for execution by at least one processor, the method comprising:

provinding a first display area for displaying images of a multi-image content, said multi-image content comprising a plurality of images;

providing a first control for defining a plurality of markings, each particular marking identifying a particular image in the multi-image content;

providing a second display area for displaying representations of the defined markings, wherein a representation is a selectable item which when selected moves a scrollbar from a first location to a second location corresponding to the location of when the particular images associated with the particular marking is displayed in said first display area; and providing a second control for initiating the generation of a menu for a presentation of the multi-image content based on the defined plurality of markings, said menu comprising a plurality of selectable scenes that correspond to the plurality of markings, each particular selectable scene associated with the particular image identified by the particular marking that corresponds to the particular selectable scene, wherein a selection of a particular selectable scene causes the presentation of the multi-image content to start at the particular image associated with the particular selectable scene.

45. A computer-implemented method of generating a menu for a video, said method comprising:

a) providing a first display area for displaying said video;

b) providing a marking tool for defining a set of markings, each particular marking associated with a particular portion of the video;

c) providing a second display area for displaying representations of the defined marking, each representation comprising at least one of a thumbnail image of an image associated with a marking a name for the marking, and a time corresponding to the time when the image associated with the marking is presented, wherein a selection of a representation in said second display area displays the image associated with the marking in said first display area; and d) providing a control for initiating the generation of the menu based on the defined set of marking, said menu comprising a set of selectable references that correspond the set of markings, each particular selectable reference relating to the particular portion associated with the particular marking that corresponds to the particular selectable reference, wherein a user selection of the particular selectable reference causes the video to start at the particular portion related to the particular selected reference.

46. The method of claim 45, wherein the set of marking comprises at least two markings, and wherein the set of selectable references comprises at least two selectable references.

47. The method claim 45, wherein the menu is a multi-page menu that includes a scene selection menu comprising at least one selectable reference and a main menu comprising a link to the scene selection menu.

48. The method of claim 45, wherein a selection of said marking tool associates the marking with the image when the image is displayed in said display area.

49. A computer-implemented method of generating a menu for a video, said method comprising:

a) providing a first display area for displaying said video;

b) providing a marking tool for defining a set of markings, each particular marking associated with a particular portion of the video;

c) providing a second display area for displaying representations of the defined marking, each representation comprising at least one of a thumbnail image of an image associated with a marking, a name for the marking, and a time corresponding to the time when the image associated with the marking is presented, wherein a selection of a representation adjusts a time marker on a timeline to a time when the image associated with the marking is displayed; and d) providing a control for initiating the generation of the menu based on the defined set of marking, said menu comprising a set of selectable references that correspond the set of markings, each particular selectable reference relating to the particular portion associated with the particular marking that corresponds to the particular selectable reference, wherein a user selection of the particular selectable reference causes the video to start at the particular portion related to the particular selected reference.

* * * * *

UNITED STATES PATENT AND TRADEMARK OFFICE
CERTIFICATE OF CORRECTION

| | |
|---|---|
| PATENT NO. | : 7,694,225 B1 |
| APPLICATION NO. | : 10/337907 |
| DATED | : April 6, 2010 |
| INVENTOR(S) | : Ralf Weber et al. |

It is certified that error appears in the above-identified patent and that said Letters Patent is hereby corrected as shown below:

On Sheet 1 of 8, in Figure 1, line 6, delete "Conent" and insert -- Content --, therefor.

In column 11, line 45, in Claim 45, delete "marking" and insert -- marking, --, therefor.

Signed and Sealed this
Eighth Day of November, 2011

David J. Kappos
*Director of the United States Patent and Trademark Office*